(No Model.)

F. J. REPP.
CODFISH SHREDDING MACHINE.

No. 550,645. Patented Dec. 3, 1895.

Witnesses
E. H. Monroe
R. M. Smith

Inventor
Frederick J. Repp.

By his Attorneys,
C. A. Snow & Co.

UNITED STATES PATENT OFFICE.

FREDERICK J. REPP, OF STEELTON, PENNSYLVANIA.

CODFISH-SHREDDING MACHINE.

SPECIFICATION forming part of Letters Patent No. 550,645, dated December 3, 1895.

Application filed February 7, 1895. Serial No. 537,657. (No model.)

*To all whom it may concern:*

Be it known that I, FREDERICK J. REPP, a citizen of the United States, residing at Steelton, in the county of Dauphin and State of Pennsylvania, have invented a new and useful Codfish-Shredding Machine, of which the following is a specification.

My invention relates to an improvement in machines for shredding codfish or separating the same into finely-divided pieces or strips, thus putting the same into proper condition for family use.

The object of my invention is to provide a simple and inexpensive, yet thorough and durable, machine of such size and capacity as shall be especially adapted for use in private homes, hotels, and eating-houses in general.

While the machine which I shall describe is particularly adapted for use in shredding codfish, it will be apparent that it may be used for other purposes.

Figure 1:
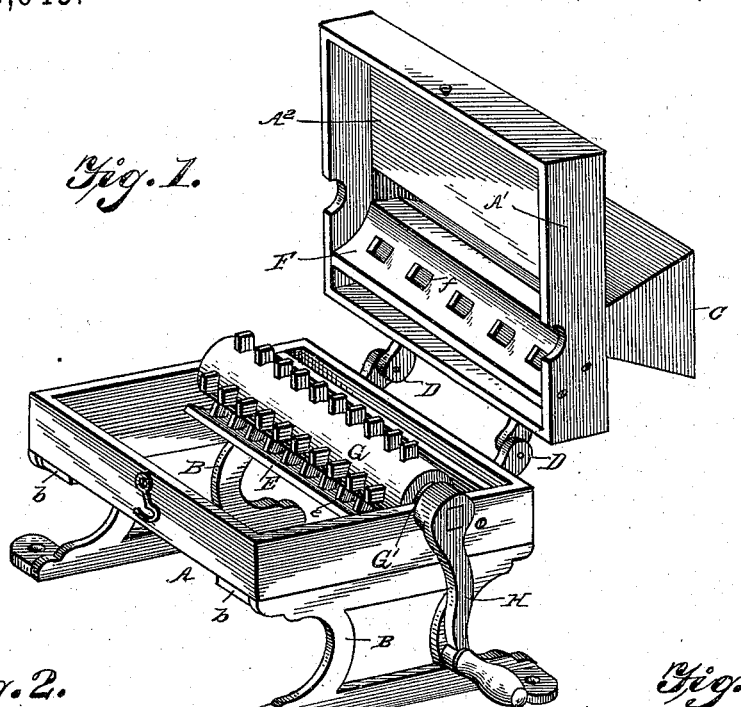
Figure 2:
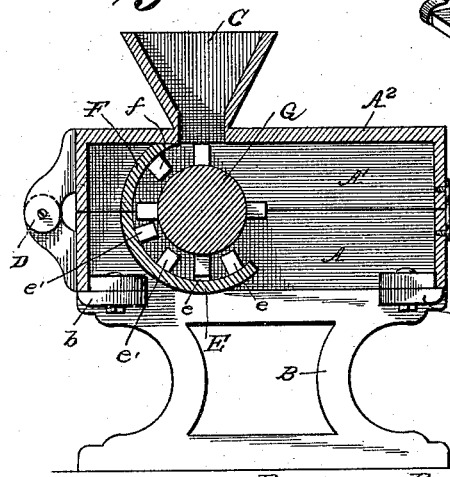
Figure 3:
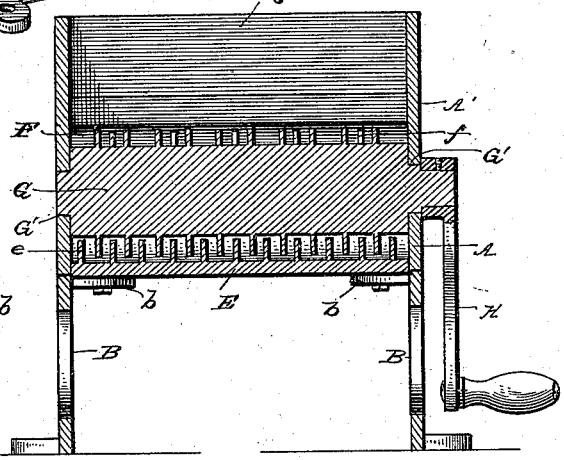
Figure 4:
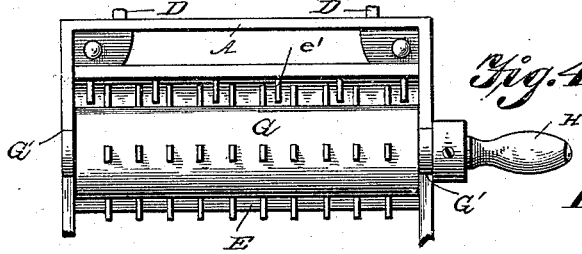

In the accompanying drawings, Figure 1 is a perspective view of my improved shredding-machine complete with the upper hinged part or cover lifted to show the interior thereof. Fig. 2 is a vertical longitudinal section through the same. Fig. 3 is a transverse section through the machine, showing the relative arrangement of the shredding-teeth. Fig. 4 is a detail plan view of a portion of the shredder, showing the relative arrangement of the teeth of the cylinder to the first row of teeth of the lower concave.

Similar letters of reference refer to similar parts in the several figures of the drawings.

A A' represent the machine frame or casing, A representing the lower part and A' the upper portion, preferably hinged thereto. The lower part A is made, preferably, of cast-iron, in the form of a rectangular open box or frame, and is supported by means of the pedestals B B. The pedestals are provided with suitable lugs or perforated ears $b$, through which the machine is screwed, clamped, or otherwise fastened to a table or other suitable support. The upper part A', also of cast-iron, is formed in the shape of a rectangular box with a cover $A^2$ and is provided with a hopper C, extending, preferably, entirely across said top, in the bottom of which an opening, extending also through the cover $A^2$, gives access to the interior mechanism. D D represent hinges of any suitable construction, through which the two parts of the machine-frame are pivoted together.

The lower part A of the casing is provided with a concave E. This concave is preferably made from cast-iron, which is tinned or galvanized to protect the same from rust. It is preferably made separate from the machine-frame and is secured within the same by means of screws, bolts, or other fastening devices. This concave is formed with several series of teeth $e$. I prefer to make these teeth blunt, in order that they may not cut the codfish, but rather crush the same and divide it into fine strips. The uppermost rows of these teeth $e'$ are preferably formed at a greater distance apart to produce an easy feed of the material at this point to the concave.

F indicates an additional concave, made and finished in the same manner as the lower concave E and secured within the upper part A' of the casing. This concave is also provided with a series of teeth $f$, of size and form similar to those $e'$ of the lower concave.

G represents the crushing and shredding cylinder, which is mounted in suitable bearings G' between the two parts A and A' of the machine-casing. This cylinder is provided with several rows or series of teeth, (four rows being shown,) said teeth being similar in form and size to those of the concaves above described. When the cylinder G revolves, the teeth thereof pass between the teeth of the concaves and, catching the codfish or other material feeding down through the hopper, carry the same and force it between said teeth, thereby tearing the codfish to pieces and separating it into finely-divided pieces or strips.

H indicates the crank for operating the machine by hand.

It is important that the operative parts of this device, such as the concaves and the shredding-cylinder, should be tinned or galvanized or otherwise coated to protect them from rust.

It will be apparent that the cylinder G and the concaves E and F may be removed from the casing for the purpose of cleansing the same by elevating the upper part A' of the casing, which will permit the removal of the cylinder. The concaves may be removed by withdrawing the screws or bolts which secure them in place.

The two parts A and A' of the frame may be fastened together in any usual or preferred manner, an ordinary hook and eye being shown for that purpose.

It will be noticed by reference to Fig. 4 that the teeth $e'$ of the upper row of the lower concave are located a greater distance apart than the teeth of the lower rows. The teeth in the upper concave are also placed a considerable distance apart, corresponding with those of the upper row of the lower concave. The object of this arrangement is to give freer feed of codfish or other material in the hopper during the first part of its movement within the concave.

Changes in the form, proportion, and the minor details of construction may be resorted to without departing from the principle or sacrificing any of the advantages of this invention.

Having described my invention, what I claim as new, and desire to secure by Letters Patent, is—

The herein described machine for shredding cod-fish, comprising a frame or casing made in two sections having a hinged connection with each other, the lower part having an open bottom, a concave made in two sections, a lower section extending entirely under the cylinder and secured to the lower stationary section of the frame, and a movable section secured to and movable with the upper hinged part of the frame, a series of rectangular shaped teeth formed integrally with both sections of the concave and formed with flat blunt edges, and of an even thickness throughout, the said teeth being grouped in rows, the number of teeth in each row gradually increasing toward the discharge end of the concave, a cylinder removably journaled between and in the meeting edges of the two sections of the frame, said cylinder being provided with blunt flat-edged teeth similar to those of the concave and formed integrally with said cylinder, and a crank handle for operating said cylinder, the working surface of the machine being galvanized or coated with an anti-corrosive material, substantially as specified.

In testimony that I claim the foregoing as my own I have hereto affixed my signature in the presence of two witnesses.

FREDERICK J. REPP.

Witnesses:
E. M. SNAVELY,
HUDSON HUGHES.